May 8, 1956  M. J. NAGY ET AL  2,744,396
WHEEL MOUNTING
Filed April 17, 1953
Fig. 1
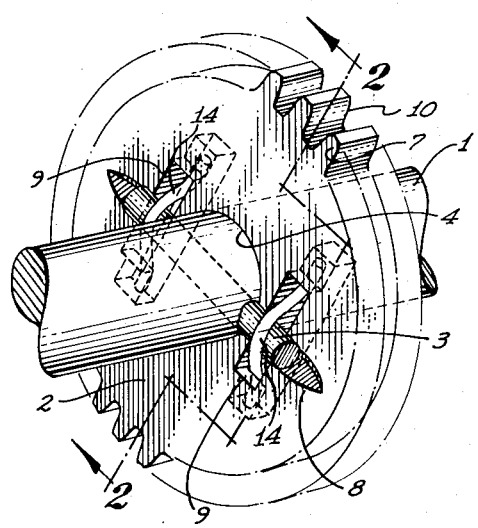
Fig. 2
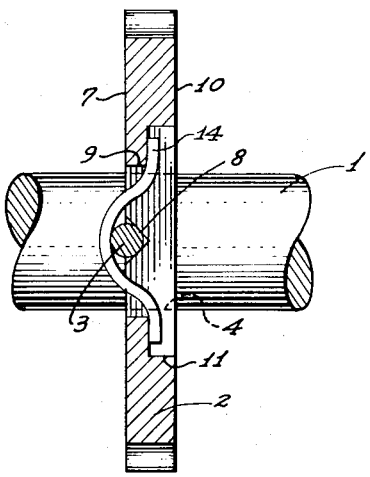
Fig. 3
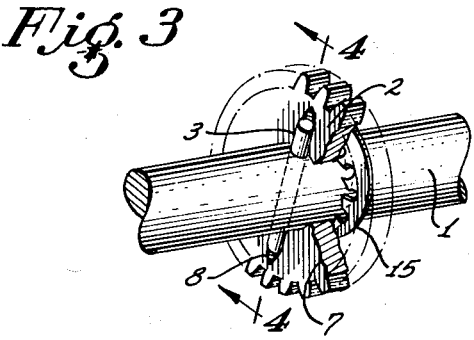
Fig. 4
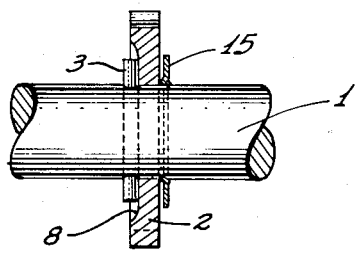
Fig. 5
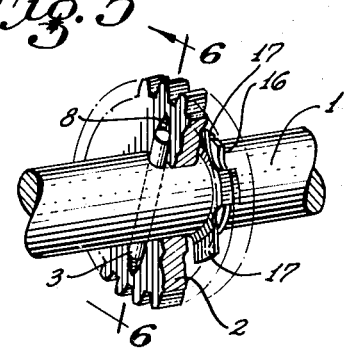
Fig. 6
INVENTORS:
Michael J. Nagy,
Donald M. Threewit
By Herbert E. Metcalf
their Patent Attorney 2,744,396
Patented May 8, 1956

2,744,396
WHEEL MOUNTING

Michael J. Nagy and Donald M. Threewit, Inglewood, Calif., assignors to Northrop Aircraft, Inc., Hawthorne, Calif., a corporation of California Application April 17, 1953, Serial No. 349,362

1 Claim. (Cl. 64—28)

My invention relates to an improved means for mounting and securing gears and other rotatable members onto their respective driving shafts.

At present, gears and other rotatable members driven by shafts are, in many cases, keyed, splined, serrated or otherwise secured to shafts by methods necessitating broaching operations. Broaching tools and machines for performing such functions are, comparatively speaking, rather expensive, especially for small run production, hence where the particular broaching tool is not available in the shop and the job order is limited in number such as to make the purchase of such a tool impractical, another means for securing the gears and the like must be found.

It is, therefore, an object of my invention to provide a simple and effective means of securing a rotatable member to its respective driving shaft without the use of a key and slot connection.

A further object of my invention is to provide an inexpensive method for securing rotatable members to their respective driving shafts.

Another object of my invention is to provide a safety device for releasing gears and the like from their shafts when locked or blocked in their operation.

For a complete disclosure of my invention, a detailed description of a preferred embodiment will now be given in connection with the accompanying drawings forming a part of the specification wherein:

Figure 1 is a fragmentary detail perspective view showing the mounting means of my invention applied to releasably hold a gear on a driving shaft.

Figure 2 is a fragmentary section along the line 2—2 of Figure 1.

Figure 3 is a fragmentary detail perspective view of a modified form of the invention showing the mounting means of my invention applied to releasably hold a gear on a driving shaft.

Figure 4 is a fragmentary section along the line 4—4 of Figure 3.

Figure 5 is a fragmentary detail perspective of still another modified form of my invention showing the mounting means of my invention applied to releasably hold a gear on a driving shaft.

Figure 6 is a fragmentary section along the line 6—6 of Figure 5.

For a detailed description of my invention reference is had to the figures. A shaft 1 on which a rotatable member 2 is to be mounted is drilled along a diameter thereof at the approximate position where the member 2 is to be secured. A pin 3 somewhat longer than the diameter of the drilled aperture is disposed therein so that a portion thereof extends outside the outer periphery of the shaft 1. The rotatable member 2 is provided with a central aperture 4 to allow for mounting it on the shaft 1. On one face 7 of said member 2 is a V-shaped groove 8 diametrically recessed in the member 7 effective to allow the pin 3 to seat therein. Equidistantly disposed from the aperture 4 and at right angles to the V-shaped groove 8 and on the same face 7 of the member 2, are slots 9 which are counter-milled on the opposite face 10 to form longer slots 11. In the case of small gears such as used to operate instruments, piano wire 14 is mounted in the slots 11 to resiliently hold the member 2 in position on the shaft 1, the ends of the lengths of piano wire being located in the extended slots, and the wire being bowed between its ends to pass over the pin 3 resting in the triangular groove 8.

A modification of the invention is shown in Figures 3 and 4 wherein an internal "shake-proof" or resilient lock washer 15 is used in lieu of the piano wire 14 and obviates the necessity of slots 9 and 11. The washer 15 due to its grip on the shaft 1 is effective to hold the rotatable member 2 against longitudinal displacement under moderate loads.

If so desired and as shown in Figures 5 and 6, a snap ring 16 mounted in a peripheral groove in shaft 1, and spring-leaf washer 17 under compression between the snap ring and gear may be used in place of the lock washer 15 of Figures 3 and 4.

The operation of the invention is relatively simple. The pin 3 is disposed through the aperture 4 in the shaft 1 and rotatable member 2 mounted thereon so that the pin 3 is seated in the V-shaped groove 8. Piano wire 14 is placed around the pin 3 and through the slots 9 with the ends of the wire 14 situated in the slots 11 as shown in Figures 1 and 2. Where abutment means such as the "shake-proof" washer 15, or snap ring 16 and spring-leaf washer 17 are used, the member 2 is similarly mounted and held in place by the abutment means 15, or 16 and 17, which are placed on the shaft 2 adjacent to the face 10 of the member 2 opposite the one having the groove therein.

It should be noted that in the invention as proposed, or in any of its modifications, there is an inherent safety factor, i. e., the securing or abutment means, viz., the piano wire 14, spring-leaf washer 17 and snap ring 16, or "shake-proof" washer 15, will only withstand a limited amount of stress. Thus, where the member 2 is blocked or the load taken on is too great, the edge of the V-shaped groove will cam the gear axially of the shaft until pin 3 is clear of the groove, and member 2 will remain stationary until pin and groove are again aligned. The angle of the groove can be varied to take care of torque requirements. If the overload conditions still exist, the pin will again ride out of the groove, this sequence of operations being repeated until either the overload is released or the rotation of the drive shaft 1 is arrested. In the species using the lengths of piano wire 14 as a securing means, the parts may be so arranged that one end of the piano wire 14 is freed from its counter-milled seat 11, enabling the shaft 1 to spin freely in the gear 2.

In the species using the spring abutment means, viz., the snap ring 16 and spring-leaf washer 17 or the "shake-proof" washer 15, the overload releasing action will be as described for Figures 1 and 2.

While in order to comply with the statute, the invention has been described in language more or less specific as to structural features, it is to be understood that the invention is not limited to the specific features shown, but that the means and construction herein disclosed comprises a preferred form of putting the invention into effect, and the invention is therefore claimed in any of its forms or modifications within the legitimate and valid scope of the appended claim.

What is claimed is:

In combination with a rotatable shaft having an annular member mounted thereon for rotation thereby, means for locating and positioning said member on said shaft comprising a groove extending transversely across one face of said member and intersecting the axis of said shaft, a transverse pin extending through the axis of said shaft opposite said groove and parallel therewith, and U-shaped springs mounted in said member astraddle said groove and having the legs thereof recessed in said member on each side of said groove, said pin being retained within the bights of said springs on each side of said shaft and urged by said springs into said groove.

References Cited in the file of this patent

UNITED STATES PATENTS

| | | |
|---|---|---|
| 902,527 | French | Oct. 27, 1908 |
| 1,860,750 | Riggs | May 31, 1932 |
| 2,062,593 | McCloud | Dec. 1, 1936 |
| 2,273,632 | Floraday | Feb. 17, 1942 |
| 2,571,669 | Boyce et al. | Oct. 16, 1951 |

FOREIGN PATENTS

| | | |
|---|---|---|
| 635,810 | France | 1928 |
| 554,979 | Great Britain | 1943 |